March 17, 1970 — M. BOWEN — 3,500,622

MOWER CUTTING BLADE

Filed Aug. 17, 1967

INVENTOR.
MARVIN BOWEN
BY Bailey & Dority
ATTORNEYS.

United States Patent Office 3,500,622
Patented Mar. 17, 1970

3,500,622
MOWER CUTTING BLADE
Marvin Bowen, Anderson, S.C., assignor of thirty-three and one-third percent to William R. Pruitt, Anderson, S.C.
Filed Aug. 17, 1967, Ser. No. 661,437
Int. Cl. A01d 55/18
U.S. Cl. 56—295                                   2 Claims

ABSTRACT OF THE DISCLOSURE

A cutting blade for a mower having a pair of spaced circular discs mounted on the rotating shaft of the mowers motor. Cylindrical cutting discs are mounted between a pair of spaced discs so that such can rotate as the cutting edge dulls exposing a sharpened portion of the cutting discs to the grass being cut. The cutting discs are also allowed to retract between the spaced cylindrical discs upon striking large objects.

---

Figure 2:
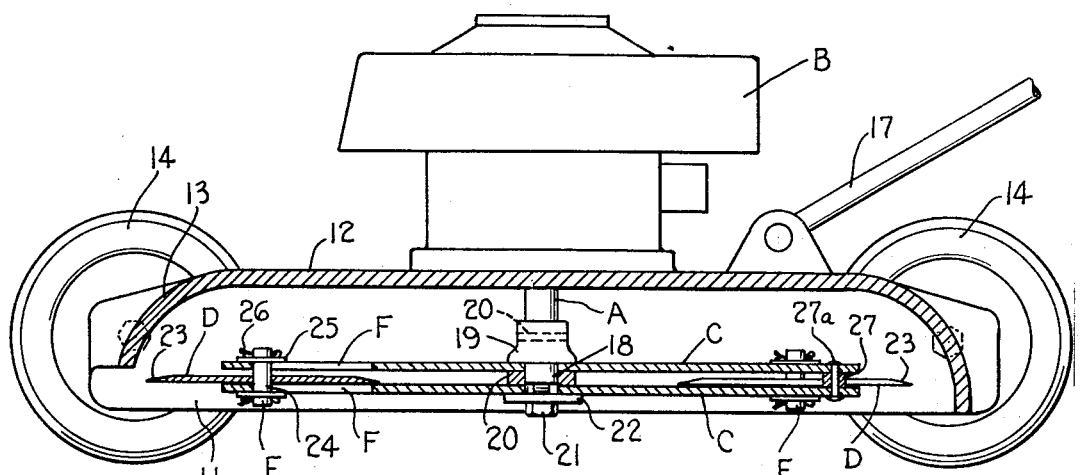

This invention relates to mowers, and more particularly to an improved mower blade for cutting grass and the like.

Mowers formerly used on farms and around the homes frequently incorporated blades in the form of cutting bars. When this type cutting bar strikes objects, such as rocks and the like, they are thrown from beneath the mower with great force often causing injury to persons and any object in the path.

Another problem with mowers which utilized a rotating cutting bar is that frequently the blade would become unbalanced due to striking obstructions causing undue wear on the motor for the mower. Moreover, the cutting edges of such rotating cutting bars are relatively small, requiring them to be sharpened regularly in order to achieve the proper cutting action. When the cutting edge of the blade is dull such tends to beat the grass down or break the grass instead of cutting it cleanly. This produces unhealthy grass, as well as unsightly grass due to brown portions forming adjacent the top of the cut grass.

It has, also, been found that mowers which utilize a rotating bar have difficulty cutting high grass and the like, due to strain on the motor.

Mowers have been developed in an attempt to eliminate the above-mentioned problems. However, for one reason or another such have not been commercially successful. Typical mowers are illustrated in Patent No. 2,592,755 granted to Soenksen, Patent No. 2,716,323, granted to Ford, and Patent No. 2,529,797 granted to Cauble.

Accordingly, it is an important object of the present invention to provide a cutting blade for mowers which can be utilized on farms and homes in cutting grass and the like, which minimizes the throwing of foreign objects, such as rocks, out therefrom at high velocity.

Another important object of the present invention is to provide a cutting blade for a mower which is not readily damaged upon striking a large object.

Still another important object of the present invention is to provide a cutting blade for a mower which is self-adjusting and does not need sharpening often.

A further important object of the present invention is to provide a cutting blade for a mower which cuts readily through high grass and the like.

Still another important object of the present invention is to provide a cutting blade for a mower and the like, which exposes a sharp cutting edge to the grass being cut for long periods of time.

Still another important object of the present invention is to provide a cutting blade for a mower which has a large cutting surface relative to rotating bar type cutting blades.

Still another important object of the present invention is to provide a cutting blade for a mower which remains balanced for extended periods of time.

Another important object of the present invention is to provide a cutting blade for a mower which emphasizes safety for the user of the mower, as well as for persons in the cutting area.

The construction designed to carry out the invention will be hereinafter described, together with other features thereof.

Figure 1:
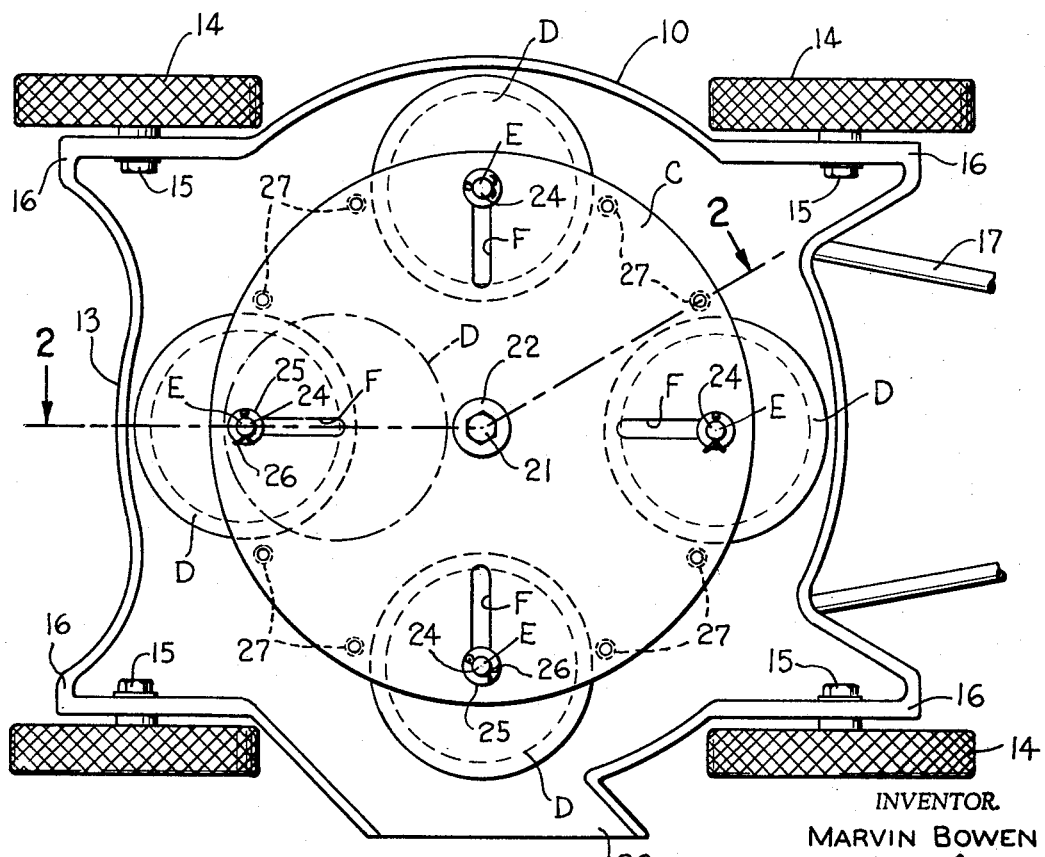

The invention will be more readily understood from a reading of the following specification and by reference to the accompanying drawing forming a part thereof, wherein an example of the invention is shown and wherein:

FIGURE 1 is a plan view looking from the bottom of a lawn mower having a blade constructed in accordance with the present invention, and FIGURE 2 is a cross-sectional view taken along line 2—2 of FIGURE 1 illustrating the cutting blade.

The drawing illustrates a self-adjusting cutting blade for a mower including a rotatable shaft A which is rotated by a motor B. Cylindrical discs C are carried by the rotatable shaft A for rotation therewith. Circumferentially spaced cylindrical cutting discs are carried adjacent the outer edge of the cylindrical discs. The cutting discs D have a sharpened cutting edge about the perimeter thereof. Means E is provided for mounting the cutting discs D on the cylindrical discs C so that the cutting discs can rotate relative thereto as the cutting edge dulls. Centrifugal force causes the sharpened edge of the cutting discs to be exposed to the grass being cut. The mounting means E are carried within slots F provided within the cylindrical discs C so that as the cutting discs D engage large objects they retract towards the rotating shaft A preventing damage thereto.

The mower is illustrated as a conventional hand push lawn mower for cutting grass; however, it is to be noted that the cutter blade constructed in accordance with the present invention could be utilized on farm equipment for cutting heavy grass as well. The motor B is mounted on top of a housing 10 which has downturned edges 11 integral with a top portion 12. The downturned portion 13 adjacent the front of the mower terminates slightly above the cutting discs D so that such does not push the grass down too low during the mowing operation. Wheels 14 are mounted by bolts 15 to the four corners of the housing 10 defined by outwardly extending projections 16. A handle 17 is mounted on the housing 10 for pushing the lawn mower.

The rotatable shaft A is the drive shaft of the motor B. The motor may be of any suitable type, such as a gasoline or electric motor, and is mounted on the top of the housing 10. A pair of cylindrical discs C are secured to the rotating shaft A so that such can rotate therewith. The cylindrical discs C have an opening 18 in the medial portion thereof for receiving the rotating shaft A. A collar 19 is fixed to the shaft by a locking pin 20 and the top cylindrical disc C abuts against the lower surface thereof. A spacer in the form of a washer 20 is carried on the shaft A between the top cylindrical disc C and the bottom cylindrical disc providing a space therebetween. A bolt 21 having a washer 22 thereon is threaded into the lower end of the rotating shaft A and drawn tight for providing a frictional engagement between the bottom cylindrical disc C and the washer 22 so that the disc will rotate with the shaft A.

Four circumferentially spaced cylindrical cutting discs D are interposed in the space between the cylindrical discs C. The cutting discs D have a sharpened cutting edge about the perimeter thereof. The cutting discs D are carried on vertical mounting posts 24. The ends of the mounting posts 24 extend through the radially extending slots F in the upper and lower cylindrical discs C. Washers 25 are carried on the outer side of the mounting posts 24 and secured thereon by cotter pins 26. The cutting discs D are allowed to rotate on the posts 24 or with the posts 24 at the edge thereof dulls due to centrifugal force. Centrifugal force will maintain the most sharpened portion of the edge at the outermost extremity, since such would normally be the heaviest edge. The radially extending slots permit the posts 24 and the cutting blades D to retract between the spaced cylindrical discs C to the position shown in dotted lines upon striking large objects. Such prevents extensive damage to the cutting blade.

Spaces 27 in the form of washers are circumferentially spaced around the cylindrical discs C for maintaining the space between the two discs and for preventing the discs from binding on the cutting discs D. The spaces 27 are carried on bolts 27a extending through the upper and lower cylindrical discs.

Since the cutting discs are circular and in one particular embodiment approximately six inches in diameter, the cutting surface provided by the four cutting blades D is approximately eighty inches. On conventional mowers which have a rotating cutting bar the cutting surface is generally in the vicinity of four to six inches, thus requiring frequent sharpening of the mower blade. In the mower blade constructed in accordance with the present invention as the outer edge of the blade dulls the cutting discs turn and centrifugal force generally maintains the most sharpened edge at the outermost extremity. Thus, the cutting blade provides a much healthier cutting action, since grass is cut rather than beat off by a fast revolving cutter bar.

Moreover, since the cutting blades D are circular when they strike foreign objects, such as rocks and the like, they hit on the tangent of the curve and are generally pushed out gently in front of the lawn mower, rather than thrown out of the side chute 28 at a high velocity. One of the most dangerous features of the majority of the power mowers on the market today is that foreign objects are thrown from thereunder at high velocities and often strike persons including the operator of the mower. The cutter blade constructed in accordance with the present invention minimizes the danger of being struck by foreign objects during the mowing operation. The possibility of warping the blades and the crank shaft of the motor is also minimized, since the cutting blades D are allowed to retract upon engaging large objects. When the crank shaft of the motor for mowers is warped such shortens the life of the motor considerably.

Another particular advantage of applicant's cutter blade is that the majority of the force being utilized during a mowing operation is in the cutting action resulting from the cutting blade D engaging the grass. Such enables the mower to cut high grass with relative ease compared to mowers utilizing rotating cutting bars. Thus, heavy grass which would normally stall mowers equipped with rotating cutting bars can be readily cut with the mower equipped with the mower blade constructed in accordance with the present invention.

What is claimed is:

1. A self-adjusting cutter blade for mowers for cutting grass and the like comprising: a rotatable shaft; a cylindrical disc carried by said rotatable shaft for rotation therewith; a plurality of circumferentially spaced circular cutting discs carried adjacent the outer edge of said cylindrical disc; said cutting discs each having a cutting edge about the perimeter thereof; means rotatably mounting each of said cutting discs on said cylindrical disc so that as the outermost portion of each of said cutting edges wears the respective cutting disc is rotated about the axis of its mounting means by centrifugal force exposing a sharpened portion of said cutting disc to the grass being cut, whereby during the mowing operation a sharp cutting edge is generally exposed to the grass being cut and foreign objects such as small rocks and the like are normally thrown from the mower at a low velocity.

2. The cutter blade as set forth in claim 1, wherein said cylindrical disc includes a pair of vertically spaced aligned disc elements; spacers interposed between said aligned disc elements for maintaining a space therebetween; said aligned disc elements having a plurality of circumferentially spaced radial slots adjacent the edge thereof, and wherein said means rotatably mounting said cutting discs includes a connecting element carried between aligned slots on said aligned disc elements which allows said cutting discs to retract between said aligned disc elements upon engagement of a fixed object thereby protecting the cutting blades from damage.

References Cited

UNITED STATES PATENTS

| | | | |
|---|---|---|---|
| 2,529,797 | 11/1950 | Cauble | 56—295 |
| 2,592,755 | 4/1952 | Soenksen | 56—295 |
| 2,716,323 | 8/1955 | Ford | 56—295 |

ANTONIO F. GUIDA, Primary Examiner

J. A. OLIFF, Assistant Examiner